Nov. 18, 1952 W. M. WHITE 2,618,137
TWO-WAY TORQUE-LIMITING CLUTCH
Filed Feb. 27, 1947 2 SHEETS—SHEET 1
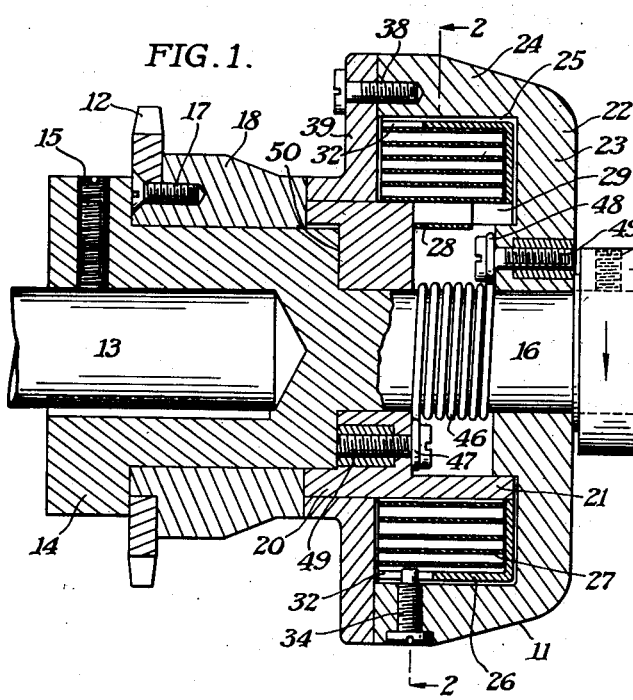
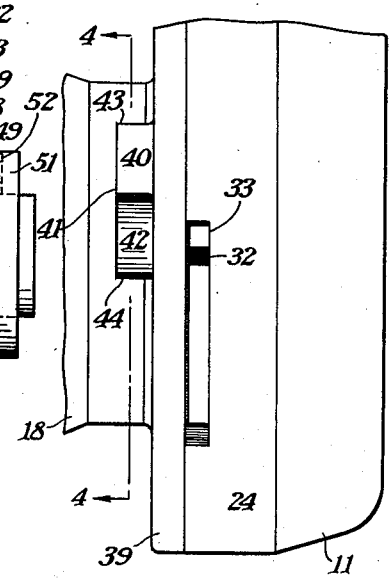
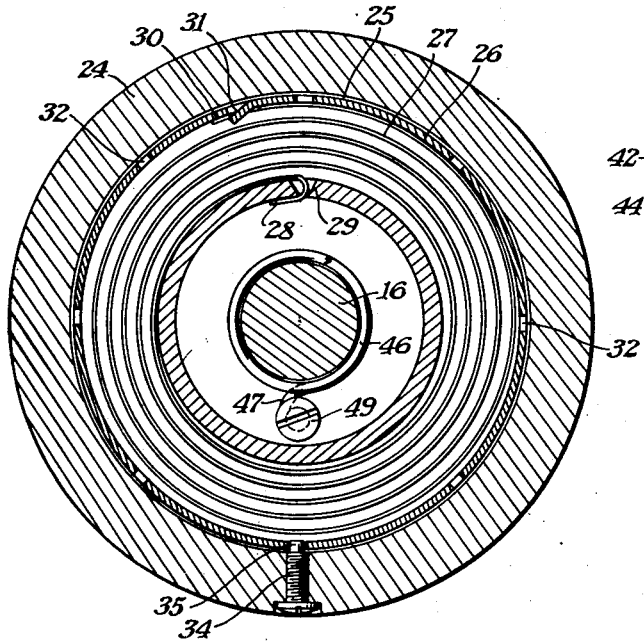
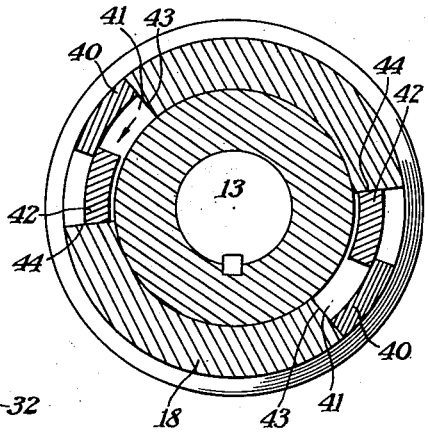
WILLIAM M. WHITE
INVENTOR
BY
ATTORNEYS Nov. 18, 1952      W. M. WHITE      2,618,137
TWO-WAY TORQUE-LIMITING CLUTCH
Filed Feb. 27, 1947      2 SHEETS—SHEET 2
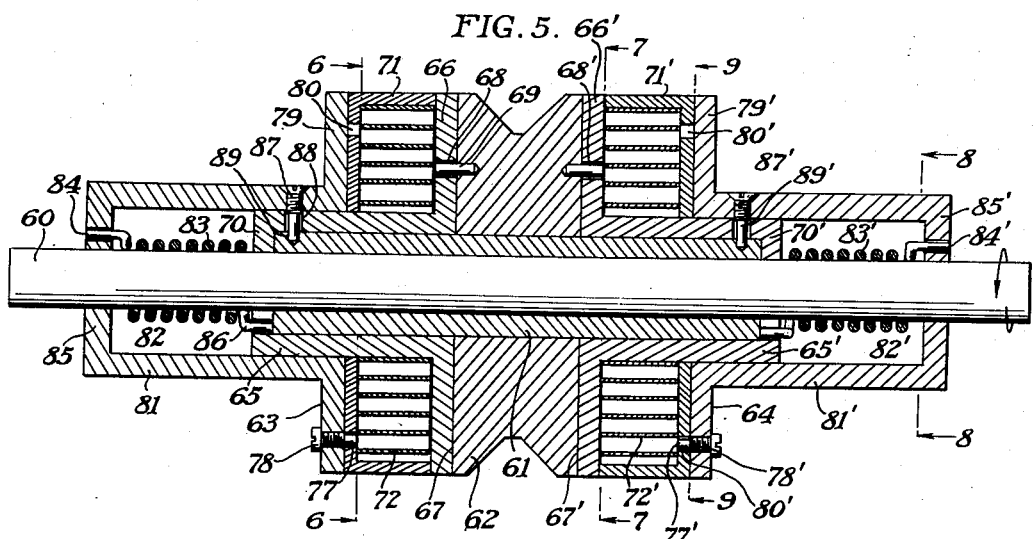
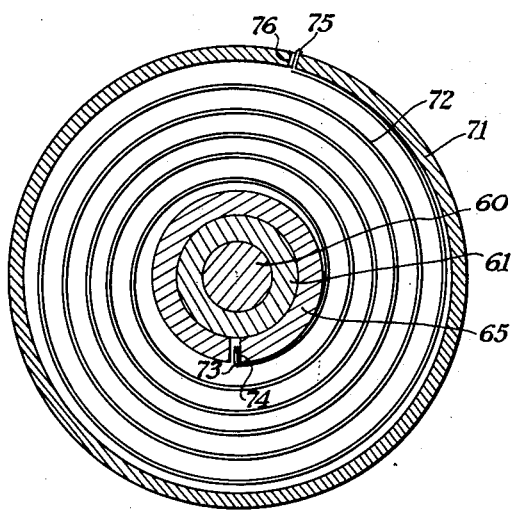
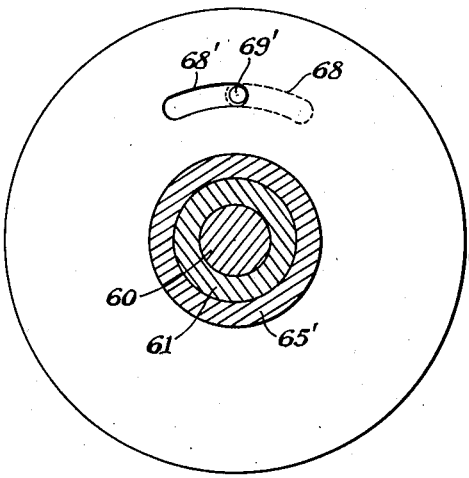
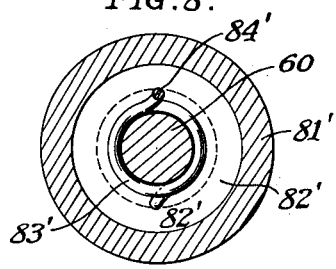
WILLIAM M. WHITE
INVENTOR
BY
ATTORNEYS Patented Nov. 18, 1952

2,618,137

UNITED STATES PATENT OFFICE 2,618,137

TWO-WAY TORQUE-LIMITING CLUTCH

William M. White, Rochester, N. Y., assignor to Eastman Kodak Company, Rochester, N. Y., a corporation of New Jersey Application February 27, 1947, Serial No. 731,233

4 Claims. (Cl. 64—30)

The present invention relates to clutches, and more particularly to a two-way, torque-limiting clutch, or an overload-release clutch in which the clutch is released when the load exceeds a pre-determined or pre-selected value.

One object of the invention is the provision of a clutch mechanism which will deliver power to a driven member until the load thereon exceeds a pre-determined value at which time the driven member is disconnected automatically from the drive means.

Another object of the invention is the provision of a two-way torque clutch which will transmit the same or different torques upon rotation of the drive means in opposite directions.

Still another object of the invention is the provision of a clutch of the type described which is simple in construction, of few parts of rugged construction, and effective in its operation.

In its broadest aspects, the invention relates to a two-way, torque-limiting or overload-release clutch, mounted on a drive-shaft and adapted to transmit power to a driven member when the shaft is rotated in either direction. However, when the load on the driven member exceeds the pre-determined value, the driven member is disconnected automatically from the drive shaft. The clutch itself comprises a pair of sleeve members, having concentrically-arranged portions mounted on the drive shaft and connected by an adjustable torque-limiting spring through which the power is transmitted to the driven member rotatably positioned on the drive shaft. A coil clutch spring is carried by the shaft and has the ends connected to the sleeves, one end of the coil serving to drive one of the sleeves. When the load on the driven member exceeds a pre-determined value, determined by the adjustment of the limiting spring, the other sleeve loses rotation and turns relative to the other sleeve to unwind the coil spring to disconnect the latter from the shaft and thus break the driving relation between the shaft and the driven member.

To these and other ends, the invention resides in certain improvements and combinations of parts, all as will be hereinafter more fully described, the novel features being pointed out in the claims at the end of the specification.

In the drawings:

Fig. 1 is a transverse sectional view showing a preferred form of a two-way torque clutch constructed in accordance with the present invention, showing the relation of the clutch parts;

Fig. 2 is a vertical sectional view taken through the clutch illustrated in Fig. 1 and substantially on line 2—2 thereof showing the arrangement of the rotatable sleeve members and the torque-limiting spring connected thereto;

Fig. 3 is a top view of the mechanism illustrated in Fig. 1;

Fig. 4 is a sectional view taken through the clutch of Figs. 1 and 2 and substantially in line 4—4 of Fig. 3, showing the driving lugs of the sleeve members;

Fig. 5 is a longitudinal sectional view through a modified form of a two-way torque-clutch constructed in accordance with the present invention;

Fig. 6 is a vertical sectional view through one of the clutch members illustrated in Fig. 5 and taken substantially on line 6—6 thereof, showing the arrangement of the sleeves and the torque-limiting spring;

Fig. 7 is a vertical sectional view taken substantially in line 7—7 of Fig. 5, showing the arrangement by which one of the sleeves may be backed off during an overload to release the clutch;

Fig. 8 is a vertical section view, taken substantially on line 8—8 of Fig. 5 showing the arrangement of one of the coil-clutch springs; and Fig. 9 is a sectional view taken substantially on line 9—9 of Fig. 5 showing the housing for the limiting spring and the adjusting holes therein.

Similar reference numerals throughout the various views indicate the same parts.

Figs. 1 to 4 show the preferred form of a two-way torque-limiting or overload-release clutch constructed in accordance with the present invention and generally indicated by the numeral 11. This clutch is adapted to transmit power to a driven member, such as the sprocket 12, when a drive shaft 13 is rotated in either direction, the sprocket 12 rotating in the same direction as the shaft 13. The latter is provided with a bushing 14 mounted on the end of the shaft and connected thereto by a setscrew 15. This bushing has a reduced end 16, which carries the clutch parts to be later described. This bushing 14 permits the entire clutch to be removed, as a unit, from the shaft upon the release of the set screw, as will be apparent upon inspection of Fig. 1. The sprocket 12 is loosely mounted on the bushing 14 and has secured thereto, by screws 17, a tubular extension 18. Thus the sprocket and extension 18 form a unitary driven member loosely and rotatably mounted on the bushing 14. However, as the latter is secured to the shaft 13, it may be considered a part thereof so that the driven sprocket may be deemed to be rotatably mounted on the drive shaft. While the sprocket 12 and the member 18 are shown as separate parts, it is apparent that they may be formed as a single member.

The reduced end 16 has loosely mounted thereon an inner-sleeve member 20 formed with an annular axially-extending rim 21. A channel-shaped outer casing or sleeve, broadly designated by the numeral 22, is also loosely carried by the end 16 and is spaced axially thereon from the innersleeve 20, as clearly illustrated in Fig. 1. This outer sleeve 22 is formed with a radially-extending portion 23 which is loosely mounted on the end 16, and which terminates in an annular rim 24 which overlies and is radially spaced from the rim 21 to provide an annular channel or recess 25. This recess has positioned therein a spring housing or casing 26 which carries a spiral torque-limiting spring 27. The inner end 28 of the spring is hooked in an opening 29 of the rim 21, while the other end 30 engages an inwardly-extending ear 31 formed on the spring casing to connect the latter to the innersleeve through the spring.

The periphery of the casing 26 is formed with a plurality of adjusting holes 32 which are movable into alignment with a slot 33 formed in the rim 24, as shown in Figs. 1 and 3. It will be apparent from inspection of Fig. 2 that the spring 27 may be wound up or tensioned by turning the casing 26 counter-clockwise relative to the rim 21 to preload the spring so as to limit the load which the sprocket 12 can transmit. Thus the load which the sprocket can carry is determined by the loading or tensioning of the spring 27, and when the load on the sprocket 12 exceeds that of the spring setting, the clutch will be disconnected automatically from the drive shaft, as will be later described. When the spring has been properly tensioned a set screw 34 positioned in the slot 32 is moved inwardly so that an end 35 thereof will extend into the registering hole 32 to hold the casing 26 to maintain the spring in its tensioned condition. By means of this arrangement, the spring 27 connects the sleeves 20 and 22 to provide a driving connection therebetween.

The rim 24 has connected thereto, by means of screw 38 or other suitable means, a plate 39 which is supported on and which cooperates with the outer sleeve 22 to provide a housing which encloses the various clutch parts as seen in Fig. 1. As the plate 39 is a part of sleeve 22, the latter may be considered broadly to be mounted on and concentric with sleeve 20. The plate is formed with a pair of axially-projecting lugs 40 which extend into diametrically-arranged slots 41 formed in the extension 18 as best seen in Fig. 4. The innersleeve 20 is also formed with a pair of diametrically-arranged lugs 42 which also extend into the slots 41. The spring 27 tends to rotate the sleeves 20 and 22 in opposite directions to move the lugs 40 and 42 to opposite ends of the slot 41, so that the lug 40 will engage edges 43 while lug 42 will engage edge 44 of the slot, as clearly illustrated in Fig. 4. The purpose of this arrangement will be later described.

The sleeves 20 and 22 are spaced axially on the end 16 and have mounted therebetween a coil clutch-spring 46 which is wrapped like a left hand thread and which tightly engages the end 16 so as to be rotated as a unit with the end 16 and shaft 13. This gripping action is caused by the torsion-limiting spring which tends to rotate the sleeves 20 and 22 in the opposite directions, the ends 47 and 48 of spring 46 being connected by screws 49 to the sleeves 20 and 22 respectively, as illustrated in Fig. 1. The outer sleeve 22 is held by a collar 51 against the rim 21 of the innersleeve 20 while the latter engages a shoulder 50 to retain the sleeves in axial position relative to the shaft. The spring 46 thus provides a coil spring clutch connecting sleeves 20 and 22 in driven arrangement with the end of the drive shaft. As the spring 27 tends to turn the sleeves 20 and 22 in opposite directions, as mentioned above, it will wind up spring 46 to maintain the latter in gripping relation with the end 16 to rotate the clutch members when the shaft 13 is rotated in either direction.

When the shaft rotates in one direction, the end 47 will act to drive the inner sleeve 20 and when the shaft is rotated in the other direction, the end 48 of the spring 46 serves to drive the other sleeve 22. In both cases, however, the drive is through both sleeves and the connecting torque-limiting spring 27 so that the power transmitted to the sprocket 12 is limited by the adjustment of the spring 27. For example, when shaft 13 turns toward the observer, or counterclockwise as viewed in Fig. 2, and indicated by the arrow, Fig. 1, the right end 48 of the coil spring 46 acts as a drive to rotate the outer sleeve with the shaft end 16. This drive is transmitted from the sleeve 22 through the rim 24 thereof, screw 34 to spring casing 26, then through the limiting spring 27 to the inner sleeve 20 to cause the lugs 42 to engage the edges 44 of slot 41 to drive the extension 18 and the sprocket 12 in a counterclockwise direction. During such counterclockwise rotation, the reacting force on the sprocket 12, due to the load thereon, is clockwise so that if the load exceeds the setting of the spring 27, the sprocket 12 and extension 18 will be rotated slightly in a clockwise direction relative to the bushing 14. This will serve to rotate the inner sleeve 20 clockwise and relative to the outer sleeve 22. This relative rotation of the inner sleeve will be transmitted to the left end 47 of the coil spring to unwind the latter to remove it out of gripping relation with the shaft end 16 to disconnect the clutch. On the other hand, a clockwise rotation of the shaft 13 and end 16 will cause the coil spring 46 to drive through the left end 47 to rotate the inner sleeve 20 with the end 16. This rotation will rotate, through the spring 27, casing 26, screw 34, the outer sleeve 22 in a clockwise direction to bring the lugs 40 into driving relation with the edges 43 of the slot 41 to rotate the member 18 and sprocket 12 in a clockwise direction. In this case, the reacting force on the sprocket, due to the load thereon, is counterclockwise so that if the load exceeds the setting of the spring 27, sprocket 12 and extension 18 and outer sleeve 22 move slightly in a counterclockwise direction relative to the inner sleeve 22 and the shaft end 16. Such relative rotation serves to move the right end 48 of the spring 46 to unwind the latter slightly to move it out of gripping relation with the shaft to disconnect the clutch parts.

Thus, the shaft can be rotated in either direction to rotate the sprocket similarly. In each case, however, the drive is through the torque-limiting spring 27 which controls the amount of load the clutch can transmit to the sprocket. When this load is exceeded, the driven sleeve loses rotation so that a relative rotative movement is imparted to the sleeve members to unwind the coil clutch spring 46 to release the latter. The loss of rotation is about 5°. Thus in either case, one end of the coil clutch spring 46 is the driving end and the other end is the releasing end. The part played by the various ends, depends, of course, on the direction of the rotation of the shaft 13. During this releasing operation, the loss of rotation of the releasing sleeve is accompanied by a further winding of spring 27.

Figs. 5 to 9 show a modified form of a two-way torque-limiting clutch. In this embodiment, the shaft 60 has loosely mounted thereon a sleeve 61 which rotatably supports a driven member such as a pulley 62. A pair of separate torque-clutch mechanisms 63 and 64 are positioned on opposite sides of the pulley 62 and are adapted to operably connect the shaft in driving relation with the pulley 62. When the shaft is rotated in one direction, away from the observer, or counterclockwise as viewed in Fig. 6, the left clutch member 63 becomes operative also to rotate the pulley in a counterclockwise direction, and the clutch 64 idles. On the other hand, when the shaft 60 is rotated in a clockwise direction, as viewed in Fig. 6 as shown by the arrow in Fig. 5, the right clutch mechanism 64 then becomes operative to similarly rotate the pulley 62 and the left clutch 63 then idles. Both clutches are identical in structure, and only one will be described in detail. The corresponding parts of the other clutch will be designated by corresponding primed numerals.

The shaft 60 carries the sleeve 61 on which the pulley 62 is centered. To the left of the pulley 62, and loosely mounted on the sleeve 61 is an inner flange sleeve which is Z-shaped in cross section and provided with a horizontal portion 65 supported by and concentric with the sleeve 61, and a vertical portion 66 positioned adjacent a side 67 of the pulley. The portion 66 is formed with a hole 68 adapted to receive a pin 69 carried by the pulley. The clearance of the hole 68 is away from the observer, as shown in Fig. 7, for a purpose to be later described. The inner flange sleeve is provided with another vertical portion 70 which engages the end of the sleeve 61 and cooperates with a similar portion of the other clutch mechanism to retain the sleeve 61 in position on the shaft 60, as is apparent from inspection of Fig. 5.

A spring casing 71 which is L-shaped in cross section rests on and is supported by the portion 65 of the inner sleeve. The periphery of the spring casing is spaced from the portion 65 to provide an annular recess or chamber for a torque-limiting spring 72. The inner end 73 of this spring is secured in a hole 74 formed in the portion 65, while the outer end 75 extends through a hole 76 in the casing periphery, as shown in Fig. 6 to connect the portion 65 to the casing through the spring. The arrangement is such that if the casing 71 is held, and the inner sleeve portion 65 is rotated in a clockwise direction, Fig. 6, the spring 72 will be wound up or tensioned. When the spring is properly tensioned, the reduced end 77 of a pin 78 carried by a flange 79 of an outer sleeve is inserted in a registering hole 80 of the casing to retain the spring in its tensioned condition and to operatively connect the casing to the outer sleeve, the casing being formed with a plurality of adjusting holes, as shown in Fig. 9. Thus the sleeves are connected through the tensioned torque-limiting spring 72.

The outer sleeve is provided with a tubular portion 81 which rests on and is rotatably supported on the portion 65 of the inner sleeve, and is concentric therewith as best shown in Fig. 5. The portion 81 extends to the left of the inner sleeve to provide a chamber 82 in which is positioned a coil clutch-spring 83 surrounding the shaft 60. The left end 84 of the spring 83 is connected to a radial portion or flange 85 of the outer sleeve. The right end 86 of the spring 83, on the other hand, is connected to the end 70 of the inner sleeve, as shown in Fig. 5. Thus the coil spring 83 is connected to both sleeves while the limiting spring 72 forms a driving connection therebetween. A pin 87 threaded in part 81 extends inwardly therefrom and through a slotted hole 88 in the portion 65 of the inner sleeve and into a registering hole 89 in the sleeve 61 to maintain the longitudinal position of the inner and outer sleeve on the shaft 60 as well as the angular arrangement of the right and left clutch parts. The clearance of the hole 88 is away from the observer to permit a counterclockwise rotation of the inner sleeve, for a purpose to be later described. This slotted hole 88 permits the inner sleeve to turn a predetermined amount relative to the bushing 61 and the outer sleeve for a purpose to be later described.

The coil spring 83 is wound like a left-hand thread so that when the shaft 60 is rotated in a clockwise direction, as viewed from the right end, the spring will tightly grip the shaft 60 so as to be driven thereby since end 84 is its driving end. This clutch spring, through its left end 84, serves to rotate the outer sleeve in a clockwise direction as a unit with the shaft. Rotation of the outer sleeve is transmitted through the flange 79, screw 78, casing 71, torque spring 72, and portion 65 to rotate the inner sleeve as a unit with the outer sleeve and the shaft. The inner sleeve, through the slot and pin connections 68 and 69, serve to rotate the pulley 62 in a clockwise direction, the pin and slot being in the relation shown in the dotted line in Fig. 7. As the pulley is rotated in a clockwise direction, the reacting force of the load on the pulley 62 is counterclockwise so that if the load exceeds the setting of the spring 72, the pulley 62 will rotate a short distance in a counterclockwise direction. The pin 69 is at the left end of slot 68, as shown in Fig. 7, so that as the pulley 62 turns in a counterclockwise direction, due to the overload, it carries the vertical ends 66 of the inner sleeve with it to also rotate the inner sleeve in a counterclockwise direction relative to the outer sleeve. This relative rotation of the sleeves is possible due to the slotted hole 88 and pin 87 which provide, in effect, a lost-motion arrangement between the sleeves. As the inner sleeve rotates or moves in a counterclockwise direction, it also moves the right end 86 of the coil spring 83, and such movement serves to unwind the coil spring and disconnect the latter and the clutch parts from the drive shaft 60.

Thus when the shaft 60 is rotated in a clockwise direction, as viewed from the right end, the coil spring 83 grips the shaft to drive the entire left clutch mechanism clockwise to cause the left end of the hole 68 to engage pin 69 to drive the pulley clockwise. However, upon overload of the pulley, the latter rocks counterclockwise to rotate the inner sleeve similarly to release the coil clutch spring to automatically disengage the entire clutch mechanism from the shaft. During this releasing movement, the pin 69 of the right clutch member moves along the slotted hole 68', as is apparent from inspection of Fig. 7.

When, however, the shaft 60 is rotated in a counterclockwise direction, the left clutch mechanism becomes inoperative, and the right-hand clutch spring 83', which is wound like a left-hand thread, grips the shaft 60 to cause the inner and outer sleeves of the right clutch to rotate counterclockwise to rotate the pulley in the same direction. Upon overload on the pulley, the latter rocks clockwise to similarly move the inner sleeve of the right clutch to cause the left end 86' of the spring 83' to unwind the spring to release the right clutch parts. In order to properly operate in the described relation, the limiting spring 72' is wound in a direction opposite to that shown in Fig. 6.

Thus, when the shaft is rotated in opposite directions, different clutch members are rendered operative automatically to rotate the pulley in the right direction. However, when the overload on the pulley exceeds the setting of the torque-limiting spring, the operative clutch is disconnected automatically from the shaft. When the load again lessens, the clutch again becomes operative to rotate the pulley. The two torque-limiting springs may be adjusted to release the spring at the same or different overloads depending upon the tensioning of the springs. Here again the loss of rotation or the reverse rotation of the inner releasing sleeve is about 5° and limited by slots 68 and 68', and such relative rotation of the sleeves imparts an increase tension on the torque-limiting springs.

While certain embodiments of the invention have been disclosed, it is to be understood that the inventive idea may be carried out in any number of ways. This application is, therefore, not to be limited to the precise details disclosed, but is intended to cover all variations and modifications falling within the scope of the appended claims.

I claim:

1. In a torque-limiting clutch, the combination with a drive shaft, of a coil spring clutch surrounding said shaft and driven directly thereby, an inner sleeve member loosely mounted on said shaft, an outer sleeve member concentric with and rotatably mounted on said inner sleeve, a spiral load-limiting spring, a housing for said limiting spring carried by said inner sleeve, said limiting spring having one end connected to said inner sleeve and the other end connected to said housing, said housing being rotatable relative to said inner sleeve to tension said limiting spring for a preselected load, said housing having a wall thereof formed with spaced apertures, and a screw carried by said outer sleeve adjacent said wall, the end of said screw engaging in one of said apertures to connect the outer sleeve of said wall to maintain the tension of said spring, the sleeves and limiting spring being arranged in series so that the drive from the shaft to the driven member will be through said limiting spring, an overload on said driven member causing a reverse rotation thereof to turn said inner member relative to said outer member and to tension said limiting spring additionally, and means connecting the inner sleeve to the other end of said coil spring so that upon the relative rotation of said inner sleeve the coil spring will be unwound to disconnect the coil spring from the shaft.

2. In a two-way torque-limiting clutch, the combination with a drive shaft adapted to be rotated in opposite directions, a driven member rotatably supported on said shaft, of a two-way clutch mechanism mounted on one end of said shaft, said mechanism comprising, a pair of concentrically arranged telescoping sleeve members rotatably supported on said shaft separately and independently of said driven member, a coil spring clutch tightly engaging said shaft so as to be driven thereby and having driving and non-driving ends, one of said sleeve members being connected to one end of said coil spring while the other is connected to the opposite end of said coil spring, said telescoping sleeve members having portions thereof spaced to provide an annular recess therebetween, a tensioned spiral spring positioned in said recess and having one end connected to one sleeve and the other end connected to the other sleeve to provide a drive connection between said sleeves, and separate means on said sleeves for engaging said driven member releasably so that one sleeve will drive when the shaft is rotated in one direction while the other sleeve will drive when the shaft is rotated in the opposite direction, said driven member rotating in a direction opposite its driven direction when under an overload, said opposite rotation serving to rotate the idling sleeve similarly so as to rotate the non-driving end of said coil spring to unwind the latter to disconnect it from the shaft.

3. In a two-way torque-limiting clutch, the combination with a drive shaft adapted to be rotated in opposite directions, a driven member rotatably supported on said shaft, of a two-way clutch mechanism mounted on one end of said shaft, said mechanism comprising, an inner sleeve member loosely mounted on said shaft, an outer sleeve member rotatably supported on said inner sleeve member, said sleeve members having spaced telescoping portions which form an annular recess, a tensioned spiral spring positioned in said recess and having the opposite ends connected to said sleeve members to provide a drive connection therebetween, a coil spring wrapped around said shaft and having the opposite ends thereof connected to said sleeves, one end of said coil spring driving one of said sleeves when the shaft is rotated in one direction, but when the shaft is rotated in the opposite direction the opposite end of said coil spring drives the other sleeves, and a lug on each sleeve engaging said driven member to rotate the latter in both directions of rotation of said shaft, an overload on said driven member causing a loss of rotation of the non-driving sleeve relative to the driving sleeve so that said non-driving sleeve will move the end of the coil spring attached thereto to unwrap said coil spring to disengage the latter from the shaft to disconnect the clutch mechanism therefrom.

4. In a two-way torque-limiting clutch, the combination with a drive shaft adapted to be rotated in opposite directions, a driven member rotatably supported on said shaft, of a two-way clutch mechanism mounted on one end of said shaft, said mechanism comprising, an inner sleeve member loosely mounted on said shaft, an outer sleeve member rotatably supported on said inner sleeve member, said sleeve members having spaced telescoping portions which form an annular recess, a tensioned spiral spring positioned in said recess and having the opposite ends connected to said sleeve members to provide a drive connection therebetween, a coil spring wrapped around said shaft and having the opposite end thereof connected to said sleeves, one end of said coil spring driving one of said sleeves when the shaft is rotated in one direction, but when the shaft is rotated in the opposite direction the opposite end of said coil spring drives the other sleeve, both sleeves rotating as a unit in either direction of rotation of the drive shaft, said driven member being formed with a peripheral slot, and a lug on each sleeve extending into said slot, the lugs engaging opposite sides of the slot so as to drive the driven member in either direction of rotation of said sleeves, an overload on the driven member causing a slight loss of rotation to the non-driving sleeve so that the latter will move the end of the coil spring attached thereto to unwind the coil spring to disconnect the latter from the drive shaft.

WILLIAM M. WHITE.

REFERENCES CITED

The following references are of record in the file of this patent:

UNITED STATES PATENTS

| Number | Name | Date |
| --- | --- | --- |
| 1,126,780 | Jones | Feb. 2, 1915 |
| 1,561,506 | Chilton | Nov. 17, 1925 |
| 1,561,537 | Hayes | Nov. 17, 1925 |
| 2,061,827 | Brooks | Nov. 24, 1936 |
| 2,151,724 | Wengel et al. | Mar. 28, 1939 |
| 2,360,187 | Almen | Oct. 10, 1944 |
| 2,459,972 | Starkey | Jan. 25, 1949 |
| 2,468,193 | Goff | Apr. 26, 1949 |